(12) United States Patent
Bojarski et al.

(10) Patent No.: US 11,199,435 B2
(45) Date of Patent: Dec. 14, 2021

(54) DEVICE FOR DETECTING THE FILL LEVEL OF MEDIA IN CONTAINERS

(71) Applicant: AB Elektronik Sachsen GmbH, Klingenberg (DE)

(72) Inventors: Aldo Bojarski, Höckendorf (DE); Ralph Adner, Dresden (DE); Lutz Uhlemann, Colmnitz (DE); Werner Fichte, Klingenberg (DE)

(73) Assignee: AB Elektronik Sachsen GmbH, Klingenberg (DE)

( * ) Notice: Subject to any disclaimer, the term of this patent is extended or adjusted under 35 U.S.C. 154(b) by 75 days.

(21) Appl. No.: 16/615,292

(22) PCT Filed: Jun. 18, 2018

(86) PCT No.: PCT/EP2018/066063
§ 371 (c)(1),
(2) Date: Nov. 20, 2019

(87) PCT Pub. No.: WO2018/234214
PCT Pub. Date: Dec. 27, 2018

(65) Prior Publication Data
US 2020/0173834 A1    Jun. 4, 2020

(30) Foreign Application Priority Data
Jun. 19, 2017 (DE) .................... 10 2017 210 153.9

(51) Int. Cl.
*G01F 23/26* (2006.01)
*G01F 23/24* (2006.01)
*B60K 15/06* (2006.01)

(52) U.S. Cl.
CPC .......... *G01F 23/266* (2013.01); *G01F 23/247* (2013.01); *B60K 15/061* (2013.01)

(58) Field of Classification Search
CPC ......... G01F 23/246–248; G01F 23/266; B60K 15/061
See application file for complete search history.

(56) References Cited

U.S. PATENT DOCUMENTS 3,878,541 A    4/1975  Dodson, III
4,125,093 A    11/1978 Platzer, Jr.
(Continued)

FOREIGN PATENT DOCUMENTS

DE    2536821     3/1977
DE    2950762     7/1980
(Continued)

OTHER PUBLICATIONS

PCT International Search Report and Written Opinion for corresponding PCT Application No. PCT/EP2018/066063, dated Oct. 16, 2018, 13 pages.

*Primary Examiner* — Justin N Olamit
(74) *Attorney, Agent, or Firm* — Dority & Manning, P.A.

(57) ABSTRACT

The invention relates to devices for detecting the fill level of media in containers.
The devices are distinguished, in particular, by a simple and reliable detection of the fill level.
For this purpose, multiple measuring points, each consisting of a series circuit of a resistor and a p-n junction, are spaced apart from one another. Each measuring point is connected, on the one hand, to an input of a multiplexer. On the other hand, the measuring points are connected to a reference potential. The output of the multiplexer is connected to a control device, wherein the control device is
  a control device periodically supplying a voltage to the measuring point connected to the control device via the multiplexer and measuring the voltage drop,
  a control device determining the medium from the temperature-dependent forward voltages resulting from the different thermal properties of the medium and
(Continued)

a control device ascertaining the fill level from the consecutive measuring points.

11 Claims, 3 Drawing Sheets

(56) References Cited

U.S. PATENT DOCUMENTS

| | | |
|---|---|---|
| 4,591,839 A | 5/1986 | Charboneau et al. |
| 4,677,850 A | 7/1987 | Miura et al. |
| 4,859,076 A | 8/1989 | Twerdochlib |
| 4,888,987 A | 12/1989 | Zhang |
| 8,763,455 B1 | 7/2014 | Chang |
| 9,400,204 B2* | 7/2016 | Schoenberg .......... G01F 23/248 |
| 2006/0144140 A1 | 7/2006 | Hache |
| 2008/0041152 A1* | 2/2008 | Schoenberg .......... G01F 23/247 |
| | | 73/295 |
| 2009/0071243 A1 | 3/2009 | Camp |
| 2010/0244779 A1* | 9/2010 | Hara ................... H02J 7/0072 |
| | | 320/152 |
| 2014/0260520 A1 | 9/2014 | Schoenberg |
| 2015/0130531 A1 | 5/2015 | Tadinada et al. |
| 2019/0118527 A1* | 4/2019 | Anderson ............ G01F 23/248 |

FOREIGN PATENT DOCUMENTS

| | | |
|---|---|---|
| DE | 4436395 | 2/1996 |
| DE | 19741892 | 4/1999 |
| DE | 20 2004 017711 | 1/2005 |
| DE | 102008012503 | 9/2009 |
| FR | 1223248 | 6/1960 |
| GB | 2138566 | 10/1984 |
| GB | 2222705 | 3/1990 |
| WO | WO 2016/088332 | 9/2017 |

* cited by examiner

DEVICE FOR DETECTING THE FILL LEVEL OF MEDIA IN CONTAINERS

FIELD

The present disclosure relates to devices for detecting the fill level of media in containers.

BACKGROUND

Publication DE 197 41 892 A1 describes a method and a device for determining the quantity and quality of a liquid. A temperature-dependent resistor element is utilized for ascertaining a fill level. The resistor element is heated via the supply of current and, at the same time, the voltage across the resistor element is measured, wherein at least two voltage values are utilized in order to ascertain the fill level.

Publication DE 44 36 395 C1 describes a fill level sensor comprising multiple voltage dividers, which are distributed over the area of the fill levels to be measured. If the fill level exceeds or falls below a voltage divider, each of which comprises a negative temperature coefficient thermistor and a positive temperature coefficient thermistor, an unambiguous jump of the output signal takes place. The thermistors are coupled to the particular medium, i.e., fuel and air in this case.

The sensitivity of these approaches is limited, for instance, by the particular material of the resistor.

Publication DE 10 2008 012 503 A1 discloses a water sensor comprising a solenoid valve. This relates to a component for monitoring the water level in a fuel filter, in particular a diesel fuel filter. The basis thereof is a fill level tube in connection with a water collection container of the diesel fuel filter. Measuring poles, which deliver a signal if the water level reaches the measuring poles, are provided at at least one given height. Therefore, only electrically conductive substances can be detected.

Publications US 2008/0 041 152 A1 and US 2014/0 260 520 A1 disclose electronic fill level sensors, which comprise linear arrangements of sensors. These comprise a thermal detector and a heat source, wherein it is detected whether the sensor is located in liquid or air. The particular heating element is mounted in close proximity to a thermal sensor, which senses the temperature of the heating element. If the temperature of the heating element changes, it is indicated whether or not the heating element is immersed. For this purpose, thermal diodes are utilized in connection with the heating elements, in the case of which the temperature-dependent current flow of a p-n junction is utilized for the temperature detection. The heating element is preferably a resistor. The fill level sensors are utilized only for establishing whether the liquid is present or is not present.

Publication US 2006/0 144 140 A1 describes a device for monitoring the liquid level in a container. For this purpose, the aforementioned device comprises a display device, which displays the liquid level within the container. The fill level is inferred via the wall temperature of the container with the aid of temperature sensors. Diode sensors are utilized as temperature sensors.

DE 25 36 821 A1 describes an electrode arrangement for monitoring the water level in steam boilers. A partition is provided, so that foam penetrating the protective tube does not come into contact with a level electrode, in order to simulate a higher water level.

SUMMARY

Aspects and advantages of embodiments of the present disclosure will be set forth in part in the following description, or may be learned from the description, or may be learned through practice of the embodiments.

One example aspect of the present disclosure is directed to

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

DETAILED DESCRIPTION

Figure 1:
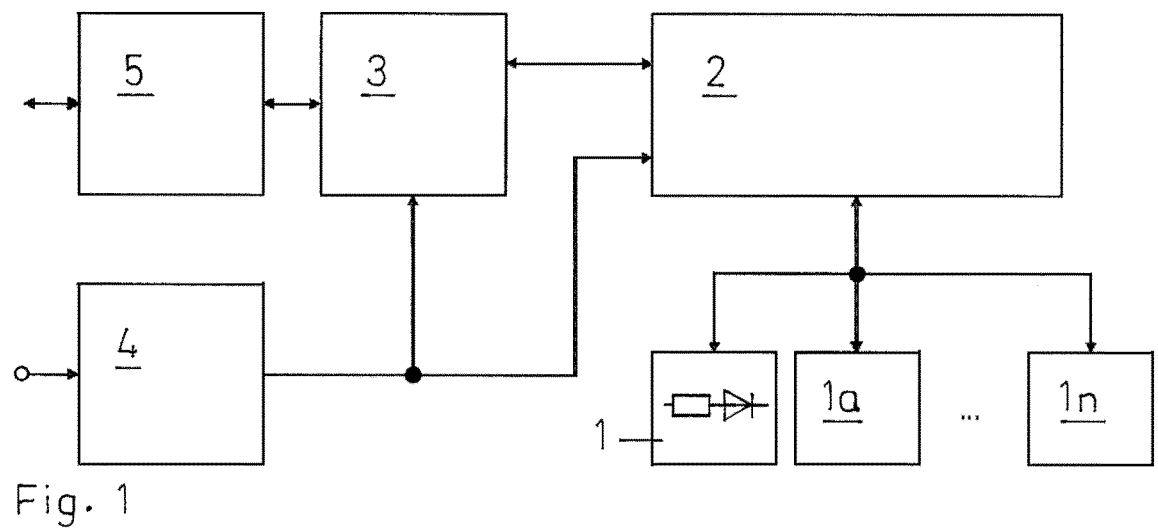
FIG. 1 shows a block diagram of a device for detecting the fill level of media in containers.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

A problem addressed by example aspects of the present disclosure is that of easily detecting the fill level of media in containers.

The devices for detecting the fill level of media in containers are distinguished, for instance, by a simple and reliable detection of the fill level.

For this purpose, multiple measuring points, each including a series circuit of a resistor and of a p-n junction, are spaced apart from one another. Each measuring point is connected, on the one hand, to an input of a multiplexer. On the other hand, the measuring points are connected to a reference potential. The output of the multiplexer is connected to a control device, wherein the control device is a control device periodically supplying a voltage to the measuring point connected to the control device via the multiplexer and measuring the voltage drop, a control device determining the medium from the temperature-dependent forward voltages resulting from the different thermal properties of the medium and a control device ascertaining the fill level from the consecutive measuring points.

The device for fill level detection is based on a thermal measuring principle, wherein the different thermal properties of media surrounding the device are utilized. This takes place with the aid of the resistors, which function as a heating device, and the p-n junctions, wherein their temperature-dependent forward voltages depending on the particular medium are measured. The forward voltages can be assigned to the particular medium on the basis of their different thermal conductivities and heat capacities. For this purpose, the measuring points can be periodically activated, one after the other, via the control device and the multiplexer.

The p-n junctions are operated in the forward direction, and the forward voltage and, therefore, the conducting-state voltage, is measured. This can take place via the supply of a constant current with the aid of constant current sources. The forward voltage is temperature-dependent, so that different voltage values set in when temperature changes occur and depending on the corresponding medium. The voltage values can be assigned to the particular medium with the aid of the control device.

In an embodiment of the present disclosure, the control device is a control device heating the medium with the aid of the particular measuring point connected to the control device via the multiplexer. Moreover, the control device is the control device detecting the resultant forward voltages and ascertaining, from the temperature difference, the thermal conductivity and/or, from the temperature increase, the heat capacity of the medium.

In an embodiment of the present disclosure, the p-n junction is a diode or the base-emitter path of a transistor.

In an embodiment of the present disclosure, the control device and the multiplexer are connected to an electrical network via a DC-DC converter, wherein the DC-DC converter is or comprises at least one constant current source.

In an embodiment of the present disclosure, the control device is connected to a transceiver of electromagnetic waves and/or to a data network and/or to an interface.

In an embodiment of the present disclosure, the p-n junctions and the resistors, as components, are located on a component carrier.

In an embodiment of the present disclosure, the component carrier, including the particular components, is either embedded in a plastic or is located in a housing.

In an embodiment of the present disclosure, the component carrier embedded in a plastic and comprising the components is arranged, with clearance, in a tube open in the direction of the medium. Moreover, the tube is located in the medium. The fill level is identical on the tube and in the tube. Fill level changes in the container cancel each other out in the tube, and so the particular fill level can be measured. Therefore, waves of a fluid in the container induced by impacts do not result in changes of the fill level in the tube, and so corrupted measurements are avoided.

In an embodiment of the present disclosure, the tube, as a first tube, is arranged, with clearance, in a second tube comprising a base. The first tube terminates at a distance from the second tube. In addition, the second tube comprises, in the end area, at least one opening connecting the interior space of the container and the space between the first tube and the second tube. A liquid medium at the second tube therefore enters the space between the first tube and the second tube as well as through the first open tube into its interior space and, therefore, reaches the device for fill level detection. The fill level of briefly tilted containers containing medium is not erroneously detected.

In an embodiment of the present disclosure, the medium is fuel, water, urea-water solution, cooling liquid, ice, air, individually or in a combination.

In an embodiment of the present disclosure, the device for fill level detection is a device for detecting the fill level of a medium or a device for detecting the fill level of multiple non-miscible media. The media can be liquids and/or gasses. These are arranged one above the other, if present. In this way, the particular medium that is present can be detected with the aid of the measuring points.

The subject matter of the present disclosure is also the use of the device according to the invention for detecting the fill level of a medium.

In order to implement the present disclosure, it is also advantageous to combine the above-described designs according to the disclosure, embodiments, and features of the claims with one another in any arrangement.

An exemplary embodiment of the present disclosure is basically represented in each of the drawings, and is described in greater detail below.

A device for detecting the fill level of media in containers is composed of multiple measuring points 1 for the media, a multiplexer 2, and a control device.

FIG. 1 shows a basic block diagram of a device for detecting the fill level of media in containers.

The measuring points 1 are spaced apart from one another on a component carrier, wherein each measuring point 1, 1a, . . . , 1n detects the surrounding medium. For this purpose, the measuring point 1 is composed of a series circuit of a resistor and of a p-n junction. The p-n junction can be a diode or the base-emitter path of a transistor, for this purpose. The resistor is a heating device for the medium. The p-n junction of the measuring point 1 is operated in the forward direction, wherein the temperature-dependent forward voltage of the p-n junction is utilized for determining the medium surrounding the measuring point 1. The basis thereof is that media have different thermal conductivities and heat capacities. The device for fill level detection is therefore based on a thermal measuring principle, wherein the different thermal properties of the media are utilized. The medium can be fuel, water, urea-water solution, cooling liquid, ice, air, individually or in a combination.

Each measuring point 1 is connected, on the one hand, to an input of the multiplexer 2. On the other hand, the measuring points 1 are connected to a reference potential. The output of the multiplexer 2 is connected to the control device in the form of a data processing system, in particular, a microcontroller 3. The control device is therefore
  a control device periodically supplying a voltage to the measuring point 1 connected to the control device via the multiplexer 2 and measuring the voltage drop,
  a control device determining the medium from the temperature-dependent forward voltages resulting from the different thermal properties of the medium and
  a control device ascertaining the fill level from the consecutive measuring points 1, 1a, . . . , 1n.
For this purpose, the control device is
  a control device heating the medium with the aid of the particular measuring point 1 connected to the control device via the multiplexer 2, and
  a control device detecting the resultant forward voltages and ascertaining, from the temperature difference, the thermal conductivity and/or, from the temperature increase, the heat capacity of the medium.

The control device and the multiplexer 2 are connected to an electrical network via a DC-DC converter 4, wherein the DC-DC converter 4 is or comprises at least one constant current source.

In addition, the control device is connected to a transceiver of electromagnetic waves and/or to a data network and/or to an interface 5.

Figure 2:
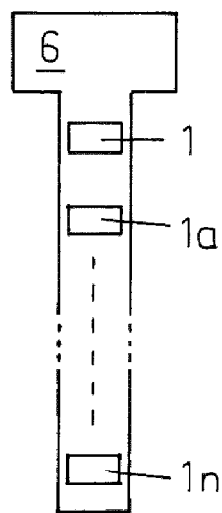
FIG. 2 shows a component carrier as a circuit board for a device for fill level detection.

FIG. 2 shows a basic representation of a component carrier as a circuit board 6 for a device for fill level detection.

The measuring points 1 are located on the component carrier, which, for example, as a circuit board 6, including the particular components and conductor tracks, is either embedded in a plastic or is located in a housing.

Figure 3:
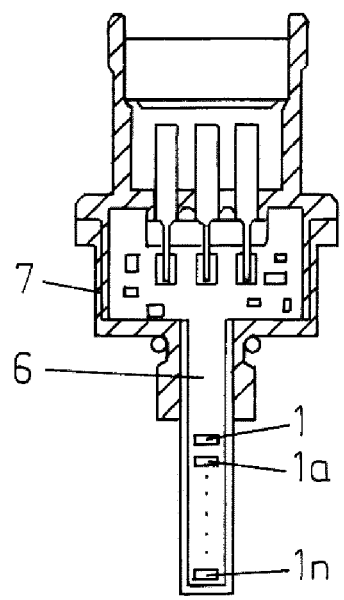
FIG. 3 shows a device for fill level detection in connection with a connector housing.

FIG. 3 shows a basic representation of a device for fill level detection in connection with a connector housing 7.

The device can be equipped with a connector housing 7 in order to more easily place the measuring points 1 in the container. Therefore, the device for fill level detection can be easily connected to an energy source and to a further data processing system.

Figure 4:
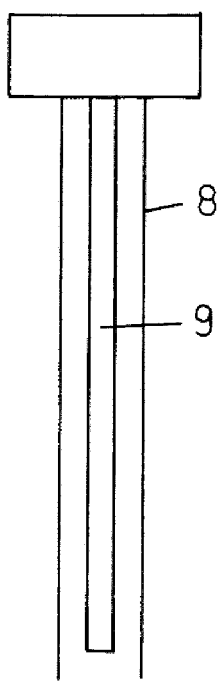
FIG. 4 shows a device for fill level detection comprising measuring points in a tube.

FIG. 4 shows a basic representation of a device for fill level detection comprising measuring points 1 in a tube 8.

In an embodiment, the component carrier embedded in a plastic and comprising the components is arranged, with clearance, in a tube 8, as a measuring unit 9, which is open in the direction of the medium, wherein the tube 8 is located in the medium of the container.

Figure 5:
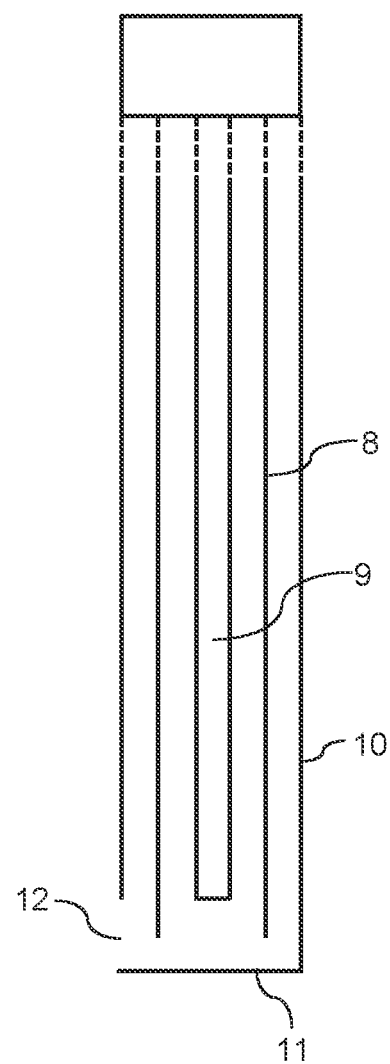
FIG. 5 shows a device for fill level detection comprising measuring points in tubes spaced apart from one another.

FIG. 5 shows a basic representation of a device for fill level detection comprising measuring points 1 in tubes 8, 10 spaced apart from one another.

Moreover, in a further embodiment, the tube 8, as the first tube 8, can be arranged, with clearance, in a second tube 10 comprising a base 11. For this purpose, the first tube 8 terminates at a distance from the second tube 10. In addition, the second tube 10 comprises, in the end area, at least one opening 12 connecting the interior space of the container and the space between the first tube 8 and the second tube 10. A liquid medium at the second tube 10 therefore enters the space between the first tube 8 and the second tube 10 as well as through the first open tube 8 into its interior space and, therefore, reaches the device 9 for fill level detection.

The invention claimed is:

1. A device for fill level detection of a medium in containers, comprising:
a plurality of measuring points, each measuring point comprising a series circuit of a resistor and of a p-n junction, each measuring point connected to an input of a multiplexer and each measuring point connected to a reference potential, wherein an output of the multiplexer is connected to a control device, wherein the control device is operable to:
supply a voltage to one of the plurality of measuring points and measure a voltage drop,
determine a type of a medium surrounding the measuring points from among a plurality of types of medium based at least in part on a temperature-dependent forward voltage of the p-n junction for at least one of the measuring points resulting from a thermal property of the medium and based on an assignment of the temperature-dependent forward voltage to the type of the medium, and
ascertain a fill level of the type of the medium from the plurality of measuring points.

2. The device as claimed in claim 1, wherein the control device is operable to heat, the medium with the aid of the first, measuring point, the control device operable to detect a resultant forward voltage of the p-n junction, the control device operable to ascertain the fluid level from the thermal conductivity of the medium based at least in part on a temperature difference or to determine a heat capacity of the medium based at least in part on from a temperature increase.

3. The device as claimed in claim 1, wherein the p-n junction for each measuring point is a diode or a base-emitter path of a transistor.

4. The device as claimed in claim 1, wherein the control device and the multiplexer are connected to an electrical network via a DC-DC converter, wherein the DC-DC converter comprises at least one constant current source.

5. The device as claimed in claim 1, wherein the control device is connected to a transceiver of electromagnetic waves or to a data network or to an interface.

6. The device as claimed in claim 1, wherein the p-n junctions and the resistors of the measuring points are located on a component carrier.

7. The device as claimed in claim 6, wherein the component carrier is embedded in a plastic or is located in a housing.

8. The device as claimed in claim 6, wherein the plurality of measuring points are arranged in a tube open in the direction of the medium when the tube is located in the medium.

9. The device as claimed in claim 8, wherein the tube is a first tube arranged in a second tube, wherein the second tube comprises at least one opening connecting an interior space of a container and a space between the first tube and the second tube.

10. The device as claimed in claim 1, wherein the plurality of types of medium comprise fuel, water, urea-water solution, cooling liquid, ice, air, individually or in a combination.

11. The device as claimed in claim 1, wherein the device for level detection is a device for detecting the fill level of a medium or a device for detecting a fill level of multiple non-miscible media.

\* \* \* \* \*